US012011770B2

(12) United States Patent
Maksimovic et al.

(10) Patent No.: US 12,011,770 B2
(45) Date of Patent: *Jun. 18, 2024

(54) HOLE-SAW WITH BRAZED OR WELDED ENDCAP

(71) Applicant: Milwaukee Electric Tool Corporation, Brookfield, WI (US)

(72) Inventors: Hannah T. Maksimovic, South Milwaukee, WI (US); Andrew Schulz, Slinger, WI (US); John P. Mohr, Slinger, WI (US); Jesse R. North, Milwaukee, WI (US); Timothy J. Signer, Waukesha, WI (US); Bradley Charles Engel, Waterford, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,018

(22) Filed: Dec. 23, 2022

(65) Prior Publication Data

US 2023/0127923 A1 Apr. 27, 2023

Related U.S. Application Data

(63) Continuation of application No. 17/111,093, filed on Dec. 3, 2020, now Pat. No. 11,534,841, which is a continuation of application No. PCT/US2020/037875, filed on Jun. 16, 2020.

(60) Provisional application No. 62/862,483, filed on Jun. 17, 2019.

(51) Int. Cl.
*B23B 51/04* (2006.01)

(52) U.S. Cl.
CPC .................... *B23B 51/0473* (2013.01)

(58) Field of Classification Search
CPC .. B23B 51/04; B23B 51/0461; B23B 51/0473
See application file for complete search history.

(56) References Cited

U.S. PATENT DOCUMENTS

| 1,449,790 | A | 3/1923 | Sprague |
| 2,473,077 | A | 6/1949 | Starbuck, Jr. |
| 2,674,026 | A | 4/1954 | Zoltan |

(Continued)

FOREIGN PATENT DOCUMENTS

| CN | 102990788 | 3/2013 |
| CN | 207386654 U | 5/2018 |

(Continued)

OTHER PUBLICATIONS

International Search Report and Written Opinion for International Application No. PCT/US2020/037875, dated Sep. 28, 2020, 12 pages.

*Primary Examiner* — Eric A. Gates
(74) *Attorney, Agent, or Firm* — Reinhart Boerner Van Deuren s.c.

(57) ABSTRACT

A hole-saw, including a sidewall and an endcap, is provided. The endcap includes projections that fit within notches of the sidewall to form a brazed or welded joint that couples the endcap to the cylindrical sidewall. The projections extend through the notches and are brazed or welded to the base of the sidewall. The endcap couples to the sidewall to form a cylindrical hole saw body. The endcap rotates and supports the hole-saw during operation.

20 Claims, 11 Drawing Sheets

(56) References Cited

U.S. PATENT DOCUMENTS

| | | | |
|---|---|---|---|
| 3,162,067 | A | 12/1964 | Koons et al. |
| 3,262,474 | A | 7/1966 | Enders |
| 3,999,619 | A | 12/1976 | Watson |
| 4,072,441 | A | 2/1978 | LaPointe |
| 4,941,783 | A | 7/1990 | Maier |
| 5,167,475 | A | 12/1992 | Miyanaga |
| 5,433,560 | A | 7/1995 | Duncan |
| 5,597,274 | A | 1/1997 | Behner |
| 7,134,815 | B2 | 11/2006 | Steer |
| 7,264,428 | B2 | 9/2007 | Cossette |
| 7,938,600 | B1 | 5/2011 | Griep et al. |
| 8,790,052 | B2 | 7/2014 | Baratta |
| 9,573,199 | B2 | 2/2017 | Baratta |
| 9,579,733 | B2 | 2/2017 | Yu |
| 9,682,431 | B2 | 6/2017 | Spera |
| 9,751,135 | B1 | 9/2017 | Terris |
| 9,821,380 | B1 | 11/2017 | Terris |
| 9,884,373 | B2 | 2/2018 | Keightley |
| 10,065,252 | B2 | 9/2018 | Hoop |
| 11,534,841 | B2 * | 12/2022 | Maksimovic ....... B23B 51/0473 |
| 11,541,466 | B2 * | 1/2023 | Baratta ................. B28D 1/041 |
| 2014/0334892 | A1 | 11/2014 | Baratta |
| 2015/0328694 | A1 | 11/2015 | Hoop |
| 2015/0343539 | A1 | 12/2015 | Hoop |
| 2016/0059322 | A1 | 3/2016 | Breslaw et al. |
| 2016/0167140 | A1 | 6/2016 | Baratta |
| 2017/0216935 | A1 | 8/2017 | Baratta |
| 2017/0252834 | A1 | 9/2017 | Spera |
| 2018/0333789 | A1 | 11/2018 | Spera |

FOREIGN PATENT DOCUMENTS

| | | |
|---|---|---|
| DE | 2410120 | 11/1982 |
| DE | 8512878 | 8/1985 |
| DE | 3541477 | 10/1993 |
| DE | 29907717 | 9/1999 |
| DE | 19818284 | 9/2002 |
| DE | 10032966 | 9/2005 |
| DE | 10357505 | 9/2005 |
| EP | 1447195 | 8/2005 |
| GB | 2324486 | 10/1998 |
| JP | 2002120218 | 4/2002 |
| KR | 100558308 | 3/2006 |
| WO | WO9731743 | 9/1997 |
| WO | WO9919598 | 4/1999 |
| WO | WO2004082875 A1 | 9/2004 |
| WO | WO14180925 | 11/2014 |

* cited by examiner

HOLE-SAW WITH BRAZED OR WELDED ENDCAP

CROSS-REFERENCE TO RELATED PATENT APPLICATIONS

The present application is a continuation of U.S. application Ser. No. 17/111,093, filed on Dec. 3, 2020, which is a continuation of International Patent Application No. PCT/US2020/037875, filed on Jun. 16, 2020, which claims the benefit of and priority to U.S. Provisional Application No. 62/862,483, filed on Jun. 17, 2019, which are incorporated herein by reference in their entireties.

BACKGROUND OF THE INVENTION

The present invention generally relates to the field of tools. The present invention relates specifically to a hole-saw with an endcap. In general, a hole-saw includes a cylindrical structure with cutting teeth at one end of the cylinder and an endcap at an end opposite the cutting teeth. In use, the endcap is coupled to a sidewall to spin the hole-saw at a high rate of speed, cutting a hole in a workpiece that has a size and shape that generally matches the size and shape of the cylindrical sidewall structure.

SUMMARY OF THE INVENTION

One embodiment of the disclosure relates to a hole-saw, including a cylindrical sidewall forming a hole-saw body when coupled to an endcap. The hole-saw includes a cutting edge at a first end of the sidewall and a second end coupled to the endcap. The endcap includes a plurality of radially extending projections. The sidewall includes a plurality cut-outs, slots, and/or notches to receive the projections on the endcap. When the projections couple to the notches of the sidewall, a cylindrical hole-saw is formed. The sidewall couples to the endcap to form a cylinder. The cylindrical sidewall includes an outer surface and an inner surface defining a hollow internal area or interior. Each sidewall notch couples with a projection of the endcap to form a brazed or welded joint between the projection of the endcap and the notch.

According to an aspect, embodiments of the disclosure relate to a hole-saw with an endcap and a cylindrical sidewall. The endcap has a plurality of radially extending central projections. The cylindrical sidewall forms the hole-saw body when coupled to the endcap. The sidewall has a cutting edge at a first end of the sidewall, a second end coupled to the endcap, and a plurality of notches located at the second end of the sidewall. The central projections on the endcap are received within the notches of the sidewall and couple the endcap to the sidewall.

According to another aspect, embodiments of the disclosure relate to a hole-saw with an endcap and a cylindrical sidewall. The endcap is formed from a plurality of endcap segments coupled together. A plurality of radially extending central projections are located on opposite ends of each of the plurality of endcap segments and the endcap segments form a hub that couples the hole saw to an arbor. The cylindrical sidewall forms the hole-saw body when coupled to the endcap. The sidewall has a cutting edge at a first end of the sidewall and a second end coupled to the endcap. A plurality of notches in the sidewall receive the central projections of the endcap segments.

According to still another aspect, embodiments of the disclosure relate to a hole-saw with an endcap defining a centerpoint and a cylindrical sidewall. The endcap has two branched endcap segments. The first branched endcap segment includes first, second, and third arms each with a central projection extending radially outward to a radial outer surface of the arm. The second branched endcap segment includes first, second, and third arms each with a central projection extending radially outward to a radial outer surface of each arm. The endcap is formed by coupling the first branched endcap segment to the second branched endcap segment such that each radial outer surface of each arm has the same radius of curvature and is located the same radial distance from the centerpoint. The hub is formed by the first and second branched endcap segments coupled at the hub and includes a threaded bore configured to couple the endcap to an arbor. The cylindrical sidewall has a cutting edge at a first end of the sidewall, a second end coupled to the endcap, and a plurality of notches that receive the central projections on the endcap.

In specific embodiments, the endcap comprises two or more segments coupled together. The segments each include projections extending outward from opposing end surfaces of the segments. These projections engage notches located at the second end of the sidewall. At the center of the endcap, the stacked segments form a threaded thickness or threaded bore configured to receive an arbor. In a specific embodiment, the endcap segments each include central or central projections that pass through notches in the sidewall. A pair of auxiliary secondary, side, or lateral projections on both ends of the endcap segment each extend at an angle on either side of the central projection. The lateral projections engage with the inner surface of the sidewall. In a specific embodiment, the notches and/or projections include an undercut to form a brazed or welded seam at the joint.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide a further understanding and are incorporated in and constitute a part of this specification. The drawings illustrate one or more embodiments and, together with the description, serve to explain the principles and operation of the various embodiments.

DETAILED DESCRIPTION

Referring generally to the figures, various embodiments of a cutter or hole-saw, including an endcap coupled to the sidewalls, are shown. In general, a hole-saw includes a cylindrical sidewall, a cutting end with cutting teeth at one end of the cylindrical sidewall, and an endcap at the other end of the cylindrical sidewall. As will be generally understood, the endcap includes a mounting structure that mounts to a driving device (e.g., a power tool). As the power tool rotates, an arbor couples a rotational tool to the endcap to drive the hole-saw in rotation and cut a hole in a workpiece. The endcap provides support and rigidity to the sidewall.

As discussed herein, the sidewall of the hole-saw discussed herein includes notches positioned to receive central projections extending from the endcap to couple to the sidewall. In various embodiments, the endcap discussed herein is assembled with central projections constructed to fit within notches of the cylindrical sidewall. This projection and notch assembly of the endcap and cylindrical sidewall ensures a perpendicular (or orthogonal) joint. In addition, the projections may be bent and/or brazed or welded to provide a reliable orthogonal brazed or welded joint with the sidewall.

For example, once the endcap is joined to the sidewall, a brazing or spot welding process on the overlaid brazed or welded joint ensures a right angle is formed between the cylindrical sidewall and the endcap. The inner surfaces of the sidewall and lateral projections also provide brazing or spot welding locations. Applicant has found that the notch and projection endcap assembly discussed herein allows for easier assembly and allows for endcap components that require less precise tolerances than conventional endcap assemblies.

In various embodiments, the endcap may be a single annular piece or may be assembled from a plurality of segments that are coupled to the saw sidewall. In various embodiments, the projections pass over an edge, e.g., through a notch, and are coupled to the sidewall, e.g., bent and/or brazed or welded, to permanently join the endcap and sidewall. The endcap and/or endcap segments include additional lateral projections coupled to the inner surfaces of the sidewall to support the sidewall.

Figure 1:
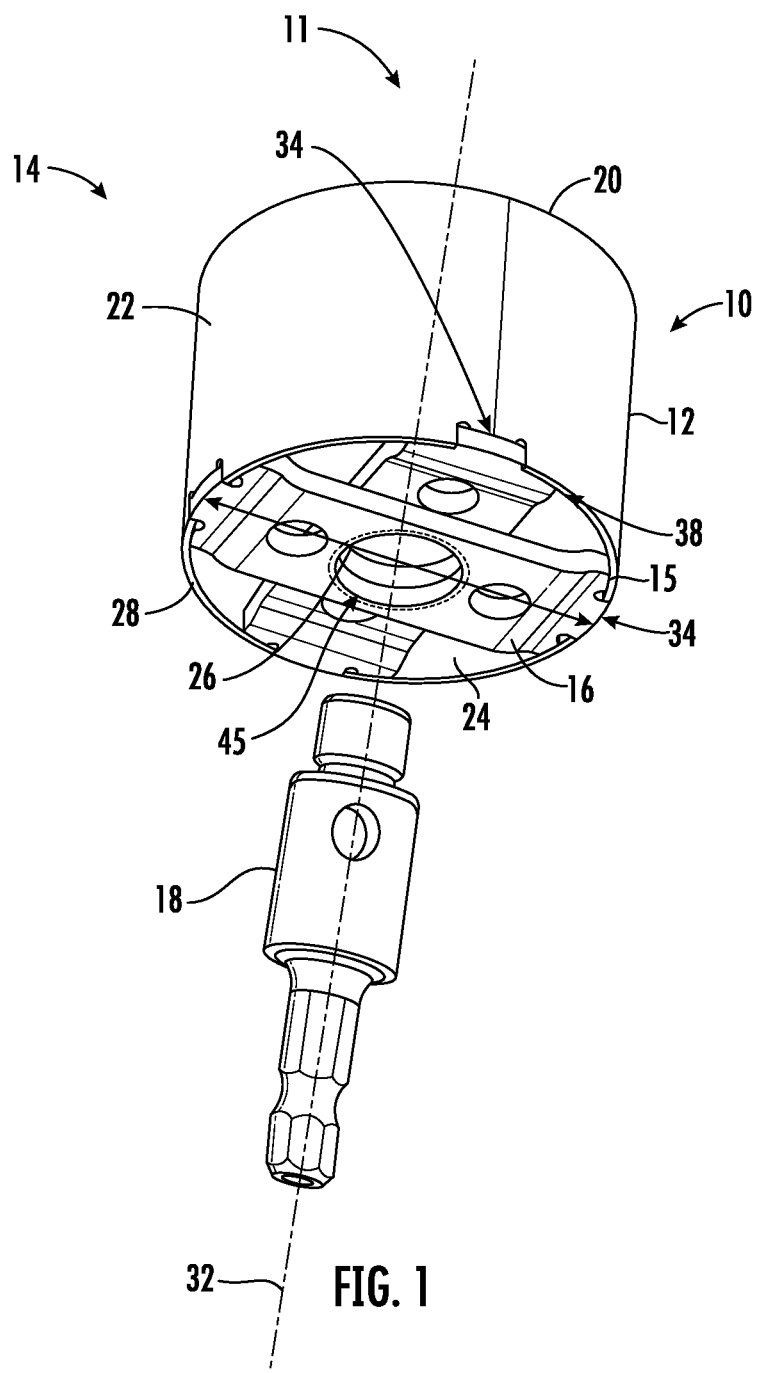
FIG. 1 is a perspective view of a hole-saw and arbor, according to an exemplary embodiment.

Referring to FIG. 1, a hole-saw 10 is shown according to an exemplary embodiment. Hole-saw 10 includes a hole-saw body 11 formed from a cylindrical sidewall 12, a cutting edge or end 14 on a first end of sidewall 12 and an opposite, second end 15 of sidewall 12 coupled to an endcap 16. In other words, hole-saw body 11 is formed when the second end 15 of sidewall 12 is coupled to endcap 16, such that sidewall 12 is formed into a cylindrical body and coupled to and supported by endcap 16. Endcap 16 includes a metal material that couples to sidewall 12 via a coupling joint structure (e.g., a braze or weld). In various embodiments, endcap 16 may be a single generally disk-shaped piece or formed from multiple segments (e.g., two or more endcap segments) coupled together and joined to sidewall 12 to create a cylindrical body. In various embodiments, endcap 16 includes a central mounting portion or hub to receive an arbor 18 and couple to a tool attachment structure. As will be generally understood, arbor 18 facilitates the coupling of hole-saw 10 to a driving device (e.g., an impact driver, power drill driver, etc.), which drives and rotates hole-saw 10 during cutting.

Cutting end 14 includes a plurality of teeth 20 that extend around cutting end 14. Teeth 20 may be formed in a wide variety of designs for different cutting applications. In a specific embodiment, teeth 20 and cylindrical sidewall 12 are formed from a single, continuous piece of metal material in which teeth 20 are formed.

Sidewall 12 is a cylindrical wall of material (e.g., metal material) that has an exterior or outer surface 22 and an inner surface 24. When rolled into a cylindrical sidewall 12 and coupled to endcap 16, hole-saw 10 forms a diameter 26. Diameter 26 defines the size of hole-saw 10. For example, hole-saw 10 in FIG. 1 is shown with a 2-inch diameter 26 and is said to be a 2-inch hole-saw 10. Thus, as will be generally understood, the circumference 28 of a 2-inch diameter 26 hole-saw 10 is approximately 6.28 inches.

Figure 4:
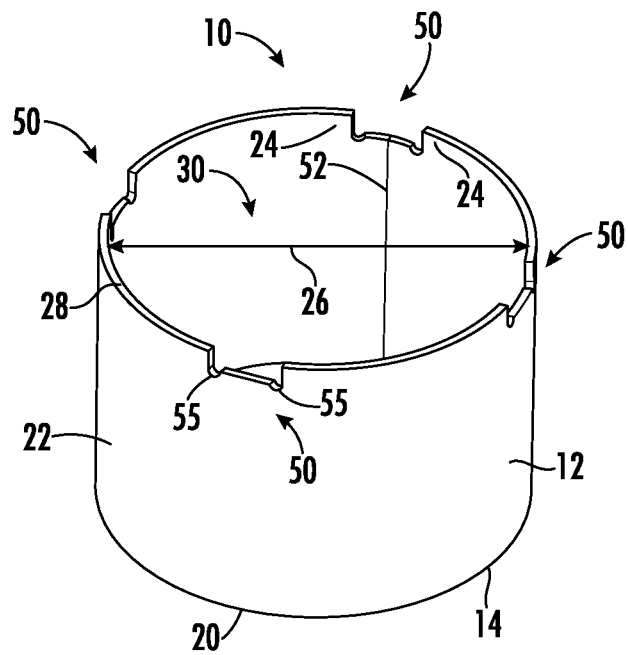
FIG. 4 is a perspective view of the sidewall of the hole-saw of FIG. 2, showing the inner surface with notches at the second end of the sidewall, according to an exemplary embodiment.

When sidewall 12 is formed (e.g., rolled) into the cylindrical body of hole-saw 10, sidewall 12 has an outer surface and an inner surface that defines a substantially hollow cylinder with a hollow internal area or interior 30 (FIG. 4). Interior 30 is defined by inner surface 24 of sidewall 12. Hole-saw 10 defines a longitudinal axis 32 that extends lengthwise through hole-saw 10. Longitudinal axis 32 extends perpendicularly to endcap 16 and a plane defined by the perimeter of cutting end 14. In at least some endcap designs discussed herein, the geometry of endcap 16 includes a number of openings 46 that provide for easy debris removal while also providing sidewall 12 sufficiently high strength and durability. Brazed or welded joints 34 are located at the area of overlap between the sidewall 12 and projections 38 of the endcap 16. Applicant has found that by using this construction, brazed or welded joints 34 are easily oriented and spot brazed or welded without a machining process around the circumference 28 of hole-saw 10.

Figure 2:
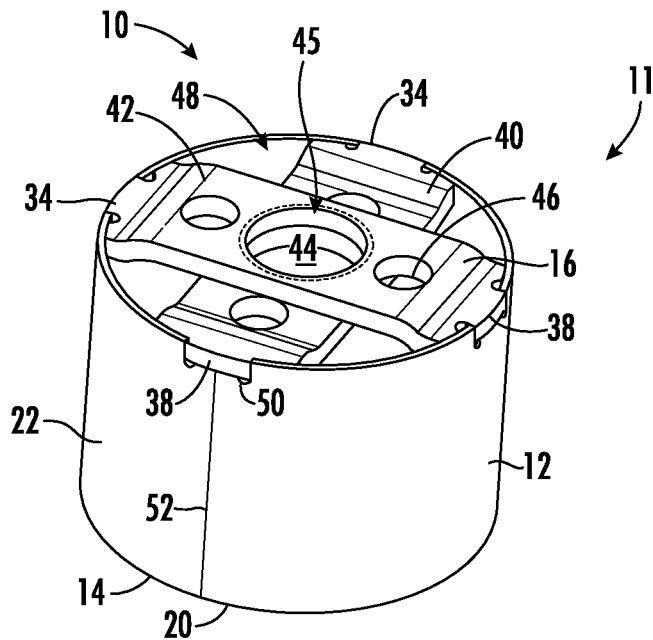
FIG. 2 is a perspective view of a hole-saw, including a sidewall and an endcap, according to an exemplary embodiment.

FIG. 2 shows a perspective view of hole-saw 10, illustrating a constructed endcap 16. In the embodiment shown, endcap 16 includes a first or inner endcap segment 40 and a second or outer endcap segment 42. Endcap segments 40 and 42 may be the same segment and are coupled at a hub 44 of endcap 16 (e.g., a central hub 44 at a center of endcap 16) that is configured to receive arbor 18 (FIG. 1). Endcap segments 40 and 42 are offset or bent in opposing directions to form an endcap 16 thickness with a threaded bore 45 at hub 44. Threaded bore 45 is formed from stacking offset endcap segments 40 and 42 oriented in opposite directions so that projections 38 are centrally located on opposite ends of each endcap segment 40 and coplanar (e.g., on a common plane).

For example, two offset endcap segments 40 and 42 are bent or offset by one half the thickness of endcap segments 40 and 42. The stacked endcap segments 40 and 42 couple at hub 44 to form threaded bore 45 and receive arbor 18 within threaded bore 45 of endcap 16. Threaded bore 45 is formed from stacked endcap segments 40 and/or 42 and threadedly receives arbor 18 in hub 44 of endcap 16. Each end of each endcap segment 40 and 42 includes medial or central projections 38 and/or lateral projections 56 that pass through notch 50 and/or couple to inner surface 24 of sidewall 12. As used herein, medial or central projections 38 are situated near a midline or midplane of endcap segments 40 and 42, and lateral projections 56 are located on sides around or about the central projection 38 to provide additional support. In a specific embodiment, one central projection 38 has two lateral projections 56 supporting joint 34 on either side of notch 50. For example, lateral projections 56 are located on opposite sides of central projection 38 form and form an angle from the central projection 38.

As shown in FIG. 2, inner endcap segment 40 and outer endcap segment 42 are coupled (e.g., brazed or spot welded) at the hub 44 of endcap 16. Endcap segments 40 and/or 42 include openings 46 formed through endcap segments 40 and/or 42. The arrangement of endcap segments 40 and 42 forms gaps 48 between the segments 40 and 42. Openings 46 provide locations for one or more pins that mount the hole-saw 10 to a driver, and gaps 48 provide access to the interior 30 of hole-saw 10 to facilitate debris removal (e.g., a slug) with a tool (e.g., screwdriver).

Endcap segments 40 and 42 extend radially outwards to form a common circular path. For example, endcap segments 40 and/or 42 are assembled such that radial outer surfaces 22 of each segment 40 and/or 42 lies on a common circular path. Geometrically, radial outer surfaces 22 have the same radius of curvature (e.g., hub radius) and are located the same radial distance from a centerpoint. Projections 38 couple to notches 50 in sidewall 12 along the common circular path.

For example, endcap 16 is made from two opposed overlapping endcap segments 40 and 42 that each have a plurality of projections 38 extending outwardly from opposing end surfaces of each endcap segment 40 and 42. A plurality of notches 50 are formed in sidewall 12 to receive projections 38 within endcap 16 (e.g., projections 38 on endcap segment 40 and/or 42). Projections 38 are coupled within notches 50 and then are brazed or welded to form joints 34 and support cylindrical sidewall 12 and hole-saw body 11. Joints 34 may be formed from stamping, forming, brazing, and/or welding processes. Projections 38 on endcap segments 40 and 42 engage and/or couple to notches 50 on the second end 15 of sidewall 12 to form joints 34.

Figure 3:
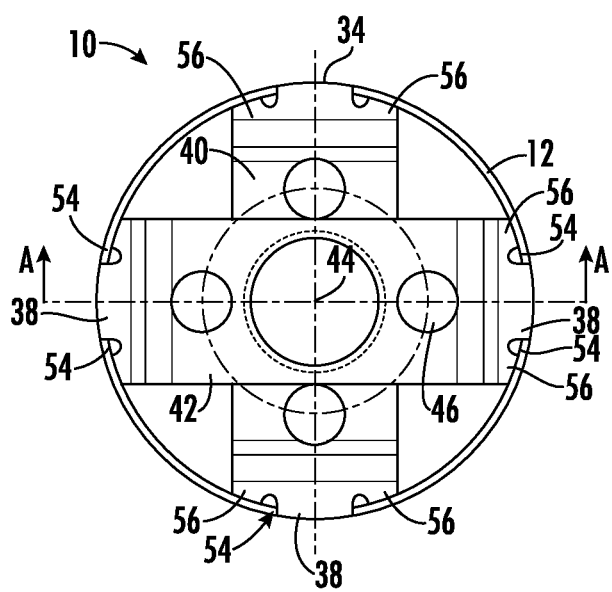
FIG. 3 is a plan view of the hole-saw of FIG. 2 showing an endcap, according to an exemplary embodiment.

FIG. 3 is a plan view of hole-saw 10 showing endcap 16. Endcap 16 is made from a plurality (e.g., two or more) endcap segments 40 and/or 42 coupled together. As shown in FIG. 3, endcap segments 40 and 42 include undercuts 54 located on either side of central projections 38. Undercuts 54 facilitate placement of projections 38 through sidewall 12 notches 50. Lateral projections 56 are located on either side of central projections 38 and/or undercuts 54. Lateral projections 56 couple to (e.g., fit within) inner surface 24 to support sidewall 12. This configuration enables lateral projections 56 to engage inner surface 24 and, along with projections 38 located within notches 50, to support brazed or welded joint 34 in a radial direction. Endcap 16 includes a plurality of radially extending projections 38 and/or 56 centrally located on opposite ends of endcap segments 40 and/or 42 to support cylindrical sidewall 12.

For example, each end of each endcap segment 40 and 42 includes three projections, two lateral projections 56, and one central or central projection 38 between the lateral projections 56. In some embodiments, a joint 34 includes two lateral projections 56 coupled to inner surface 24 of sidewall 12 (e.g., at the second end 15) and central projection 38 coupled to the notch 50 in sidewall 12. In another example, each notch 50 in sidewall 12 couples with one projection 38 of endcap 16 to form the joint 34 between projection 38 and notch 50. Projections 38 extend through notches 50 of sidewall 12 to support second end 15 in an axial direction (e.g., along the longitudinal axis 32). In some embodiments, brazed or welded joint 34 includes spot welds between endcap segments 40 and 42, between projection 38 and notch 50, and/or between projections 38 and inner surface 24.

In various embodiments, hole-saw 10 has a diameter 26 between 0.25 inches and 4 inches, specifically between 0.5 inches and 3.5 inches, and more specifically between 1 inch and 3 inches. Similarly, each endcap segment 40 and/or 42 has a length equal to or greater than the hole-saw 10 diameter 26 and a width between 0.5 inches and 1 inch. Hub 44 has a radius between 0.25 inches and 2 inches, specifically between 0.5 inches and 1 inch. Openings 46 may also be formed in endcap segments 40 and/or 42 and have a diameter 26 between 0.1 inches to 1 inch, specifically between 0.2 inches and 0.5 inches. Projections 38 include an undercut 54 that enables the projection 38 to extend radially along the perimeter or circumference 28 of the cylindrical sidewall 12.

FIG. 4 is a perspective view of a cylindrical sidewall 12 without endcap 16. Seam 52 joins the rolled sidewall 12 to form cylindrical sidewall 12. In the specific embodiment shown, the second end 15 of sidewall 12 includes four notches 50 with eight undercuts 55. As shown in FIG. 4, undercuts 55 are in the 6 o'clock position of notch 50, but undercuts 55 may also be located in the 3 o'clock and/or the 9 o'clock positions of notch 50. For example, notch 50 may have undercuts 55 at 3 o'clock and 6 o'clock on one side and undercuts at 9 o'clock and 6 o'clock on the opposite side. In this way, undercuts 55 relieve sharp edges or corners in sidewall 12 and/or endcap 16. Notches 50 receive central projections 38 of endcap 16 (FIG. 2). For example, notches 50 that include undercuts 55 in sidewall 12 couple to central projections 38 on endcap 16 and the undercut 55 receives central projection 38 in notch 50 to form a welded seam 52 and/or joint 34 at the end of each endcap segment 40 and/or 42 that couples central projection 38 to notch 50. Welded seam 52 couples central projections 38 and/or lateral projections 56 of each endcap segment 40 and/or 42 to one notch 50 in sidewall 12.

Figure 5:
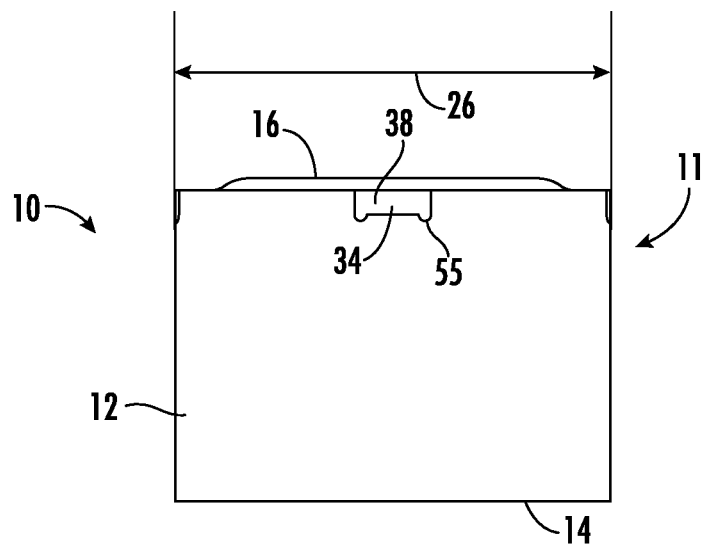
FIG. 5 is a side view of the hole-saw of FIG. 2 showing endcap segments engaged with the sidewall notches, according to an exemplary embodiment.

FIG. 5 is a side view of the hole-saw 10 of FIG. 4 and illustrates undercuts 55 in sidewall 12 and shows a thickness of one endcap segment 40 or 42. In various embodiments, endcap segments 40 and/or 42 have a thickness between 0.05 inches and 0.3 inches, specifically between 0.075 inches and 0.2 inches, and more specifically between 0.1 and 0.2 inches. In a specific embodiment shown in FIGS. 3 and 5, endcap segments 40 and 42 have a length of 2 inches, a width of 0.728 inches (FIG. 3), and a thickness of 0.105 inches.

Figure 6:
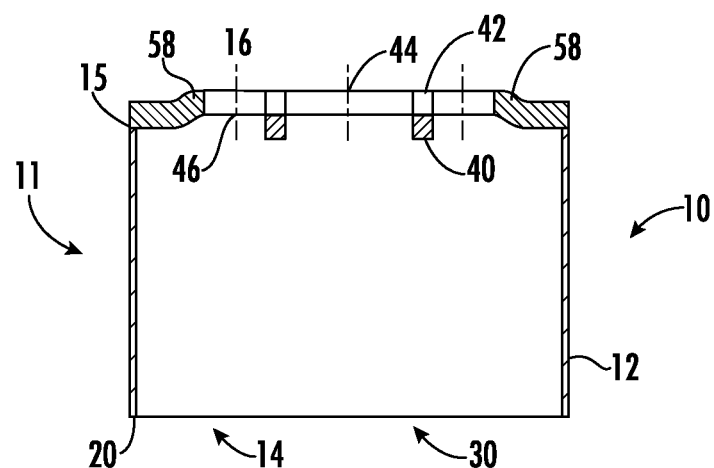
FIG. 6 is a cross-sectional view of the hole-saw of FIG. 3 taken along line A-A, according to an exemplary embodiment.

FIG. 6 shows a cross-section of a hole saw 10 taken along line A-A of the hole-saw 10 shown in FIG. 3. As shown in FIG. 6, hole-saw 10 has a hub 44 formed through an inner endcap segment 40 and an outer endcap segment 42. Similarly, outer endcap segment 42 includes a pair of bends 58 distorting the endcap segment 42 in opposite directions. Inner endcap segment 40 extends in one direction (e.g., into and out of the plane of the page), and outer endcap segment 42 extends in an angled direction relative to endcap segment 40 (e.g., along the plane of the page). In some embodiments, endcap segments 40 and 42 are identical segments that are oriented differently (e.g., opposite one another) to form endcap 16.

A thread thickness 60 is formed at hub 44 from the combined stacked thicknesses of inner endcap segment 40 and outer endcap segment 42. Thread thickness 60 provides structural support to a connection between endcap 16 and arbor 18 (e.g., a threaded connection). In various embodiments, thread thickness 60 is between 0.1 inches and 0.3 inches, specifically between 0.15 inches and 0.25 inches, and more specifically between 0.175 inches and 0.225 inches.

Sidewall 12 includes a height 62 measured from the second end 15 of endcap 16 to teeth 20 on cutting end 14. In various embodiments, sidewall 12 height 62 is between 0.5 inches and 3 inches, specifically between 1 inch and 2 inches. In a specific embodiment, thread thickness 60 is 0.210±0.05 inches, and the sidewall height 62 is 1.220±0.5 inches. Applicant has found that using an endcap 16 with a thread thickness 60 and sidewall 12 height 62 within these ranges enables the endcap 16 to support the sidewall 12 during operation.

Figure 7:
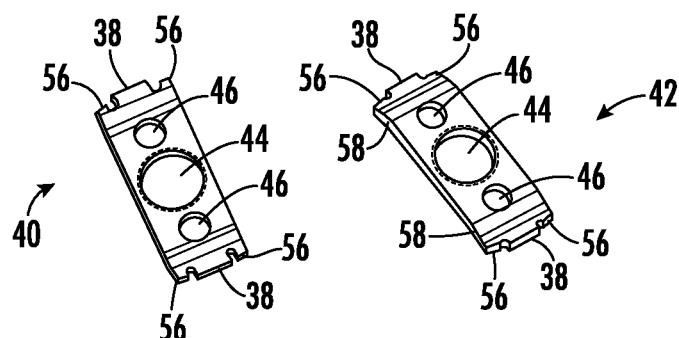
FIG. 7 is a perspective view of a pair of endcap segments that couple to form an endcap, according to an exemplary embodiment.
Figure 8:
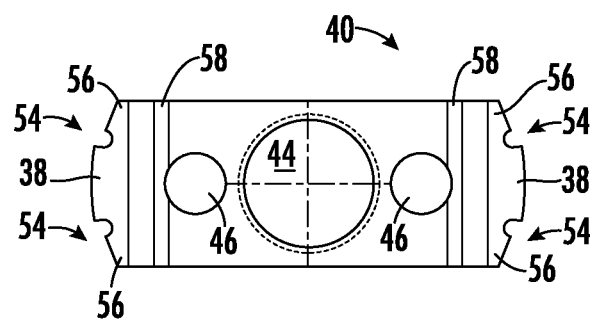
FIG. 8 is a plan view of an endcap segment shown in FIG. 7, according to an exemplary embodiment.

With reference to FIGS. 7-8, various views of endcap segments 40 and/or 42 are shown. As illustrated, endcap segments 40 and 42 are the same as each other (e.g., are the same component, but assembled in the opposite orientation from each other to form endcap 16). In some embodiments, endcap segments 40 and 42 are formed in the same manufacturing process, e.g., a stamping process that produces a single endcap segment 40. Two endcap segments 40 are then reversed and joined at a right angle on hub 44 to form endcap 16. For convenience only, endcap segment 40 is referenced, but the description applies equally to endcap segment 42.

FIG. 7 shows top and bottom perspective views of endcap segment 40 prior to coupling to form endcap 16.

FIG. 8 shows a plan view of endcap segment 40. In this view, projections 38 are illustrated with undercuts 54. In some embodiments, central projections 38 extend over sidewall 12 to outer surface 22, and lateral projections 56 fit or couple within inner surface 24 of sidewall 12 (FIGS. 1 and 4).

Figure 9:
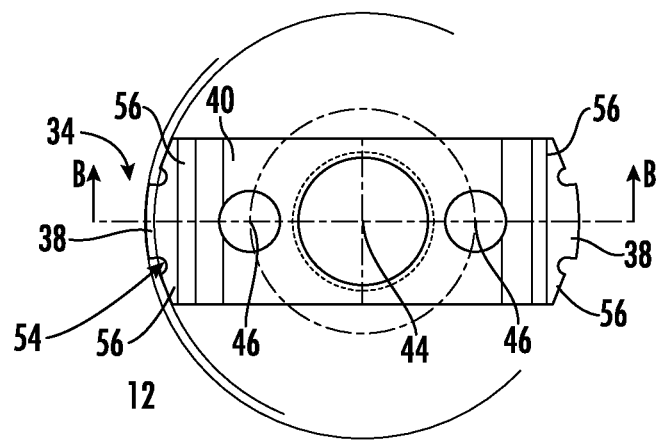
FIG. 9 is a plan view of the brazed or welded joint created between an endcap segment and the notch of a sidewall, according to an exemplary embodiment.

FIG. 9 illustrates a specific embodiment of a brazed or welded joint 34 formed on a 2-inch hole-saw 10 (e.g., a hole-saw 10 with a 2-inch outer diameter 26). As shown in FIG. 9, projections 38 extend through notches 50 (FIG. 4) to overlap sidewall 12 and form a brazed or welded joint 34. Lateral projections 56 also fit within inner surface 24 of sidewall 12. In various embodiments, sidewall 12 has a thickness of 0.07 inches to 0.2 inches. For example, in a specific embodiment, the outer diameter 26 is 2±0.25 inches, an inner diameter is 1.856±0.050 inches for a sidewall 12 thickness of 0.139 inches to 0.149 inches. In various embodiments, projections 38 have a width between 0.2 inches and 0.5 inches, specifically between 0.3 inches and 0.4 inches, and more specifically between 0.3 inches and 0.35 inches. Projections 38 have a width of 0.335±0.050 inches. Brazing or welding sidewall 12 to projections 38 within these ranges provides an adequate area to form a braze or spot weld without distortion to maintain a perpendicular brazed or welded joint 34.

With reference to FIGS. 3 and 9, in a specific embodiment, the 2-inch diameter 26 hole-saw 10 includes two endcap segments 40 and 42 coupled together at hub 44. Hub 44 has a diameter of 5/8 inches and supports four projections 38 extending through cylindrical sidewall 12. Each endcap segment 40 and 42 includes a pair of 0.269-inch openings 46, for a total of four openings 46 located along a 1-inch diameter concentric circle located within the perimeter or circumference 28 of sidewall 12. Endcap segments 40 and 42 have a width of 0.728 inches.

Figure 10:
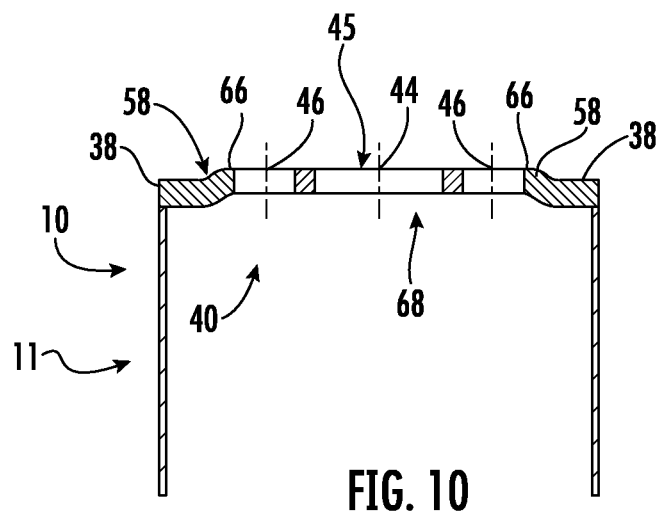
FIG. 10 is a cross-sectional view taken along line B-B of the endcap segment shown in FIG. 9, according to an exemplary embodiment.

FIG. 10 is a cross-section view of endcap segment 40 taken along line B-B of FIG. 9, according to an exemplary embodiment. The cross-sectional view shows two bends 58 (e.g., a pair of bends 58) that form projections 38 that are located at an offset distance 68 below a central flat region 66 of endcap segment 40. In other words, projections 38 are displaced from the central flat region 66 by an offset distance 68. In the orientation of FIG. 10, offset distance 68 is the vertical distance that projections 38 extend downward from central region 66.

For example, when endcap segment 40 and 42 are coupled they form projections 38 and/or 56 that are coplanar about a midplane of endcap 16. The offset distance 68 locates each projection 38 and/or 56 of each endcap segment 40 and 42 is located on the midplane of endcap 16.

In various embodiments, the thickness of endcap segments 40 and 42 is between 0.05 inches to 0.3 inches, specifically between 0.075 inches and 0.2 inches, and more specifically between 0.1 and 0.2 inches. In these various embodiments, offset distance 68 is between 0.025 inches and 0.15 inches, specifically between 0.03 inches and 0.1 inches, and more specifically between 0.05 inches and 0.1 inches. In a specific embodiment, the thickness of endcap segment 40 is 0.105±0.05 inches, and the offset distance 68 is 0.052±0.02 inches. In some embodiments, offset distance 68 is one half the thickness or gauge of endcap segment 40.

In some embodiments, the surface area of central flat region 66 on one side of endcap segment 40 is between 40% and 80% of the total surface area on that side of endcap segment 40 ("total area"). In various embodiments, the surface area of central flat region 66 is between 50% and 60% of the total area of endcap segment 40, specifically between 55% and 65% of the total area of endcap segment 40. In a specific embodiment, central flat region 66 extends 1.235 inches along a 2-inch diameter 26 endcap segment 40.

In this configuration, central flat region 66 has a surface area on one side of endcap segment 40, which is 61.75% of the total surface area on that side of endcap segment 40.

Figure 11:
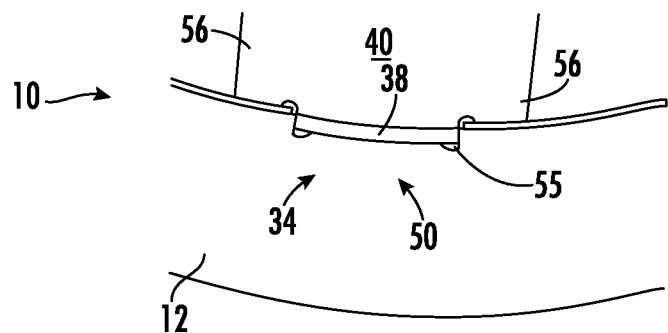
FIG. 11 is a detailed perspective view of a brazed or welded joint created between an endcap segment at the second end of a sidewall, according to an exemplary embodiment.

FIG. 11 shows a detailed view of one brazed or welded joint 34 of hole-saw 10. As shown, projection 38 of endcap segment 40 extends through notch 50 to form joint 34. Lateral projections 56 are coupled to sidewall 12 and provide additional support to the cylindrical body 11. In some embodiments, sidewall 12 does not have notches 50 and projection 38 extends over sidewall 12. Central projection 38 and lateral projections 56 are coupled to sidewall 12 and spot welded and/or brazed to create joint 34.

Figure 12:
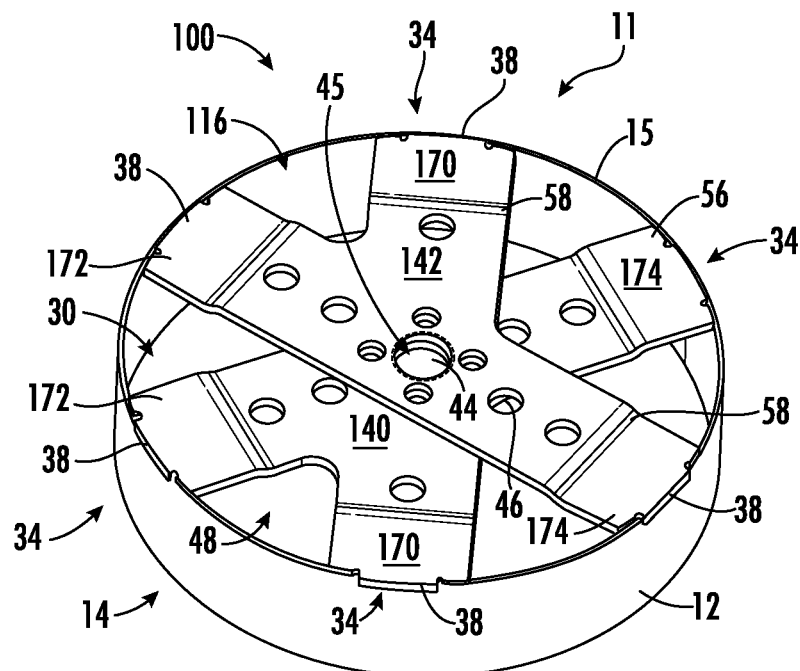
FIG. 12 is a perspective view of a hole-saw, including a sidewall and an endcap formed from two endcap segments, according to an exemplary embodiment.
Figure 13:
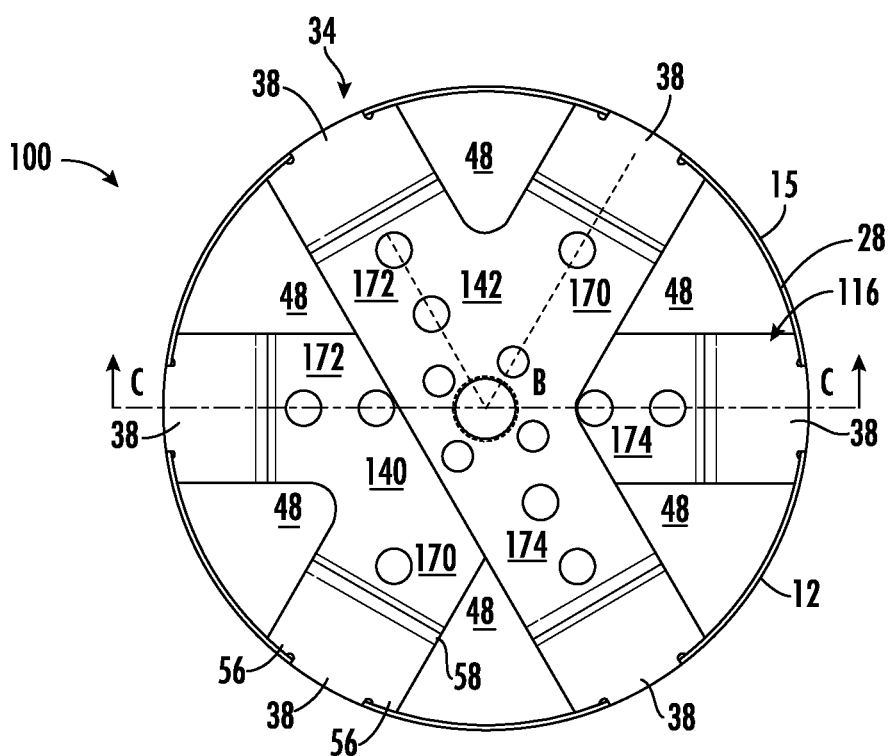
FIG. 13 is a plan view of the second end of the hole-saw of FIG. 12, according to an exemplary embodiment.

FIGS. 12-13 show hole-saw 100, according to an exemplary embodiment. Hole-saw 100 is substantially the same as or similar to hole-saw 10, except for the differences described. In contrast to the design of hole-saw 10, endcap 116 of hole-saw 100 is formed from multi-armed or branched endcap segments 140 and 142. Branched endcap segments 140 and 142 have three arms, legs, or branches 170, 172, and 174 that extend radially outwards to form a circular perimeter with an additional third projection 38 to couple endcap 116 to the second end 15 of sidewall 12.

For example, each branched endcap segment 140 and/or 142 has three or more projections 38 and/or 56. A central projection 38 at each end of branches 170, 172, and/or 174 is received in notch 50 on sidewall 12 and two lateral projections 56 on opposite sides of central projection 38 couple to inner surface 24 at the second end 15 of sidewall 12 to form the cylindrical hole-saw body 11. In some embodiments, branched endcap segments 140 and 142 increase the support for a larger diameter 26 hole-saw 100 (e.g., a 6-inch diameter hole-saw 100). Similar to endcap 16, endcap 116 provides structural rigidity and support to sidewall 12 and facilitates coupling hole-saw 100 to an arbor 18 (FIG. 1). For example, two offset branched endcap segments 140 and 142 are offset by one half of a thickness of the endcap segment 140 and/or 142. An end of each branch 170, 172, and 172 (e.g., end of endcap segments 140 and/or 142) has a central projection 38 and at least two lateral projections 56.

FIG. 12 shows a perspective view of endcap 116 constructed from two-branched endcap segments 140 and 142. Each endcap segment 140 and 142 includes three branches 170, 172, and 174. Each branch 170, 172, and 174 includes projections 38 that overlap notches 50 of sidewall 12. The angles and orientation between each branch 170, 172, and 174 on endcap 116 enhance structural support on sidewall 12.

With reference to FIGS. 12 and 13, an angled branch 170 extends at an angle A from the line formed through a center of bottom branch 172 and top branch 174. In various embodiments, branched endcap segments 140 and/or 142 include an angled branch 170 with an angle A between 25 degrees to 90 degrees, specifically between 40 degrees and 70 degrees. An angle A is selected to provide equal spacing of placement of brazed or welded joints 34 around endcap 116. In some embodiments, an angle B between branch 170 of endcap segment 142 and branch 174 of endcap segment 140 forms an angle that is the same as angle A. For example, an acute angle A between branch 170 and 172 is 45, 60, or 90 degrees depending on the orientation and the number of branches 170, 172, and 174 in branched endcap segments 140 and 142. In the example of FIGS. 12-13, the acute angle A between branch 170 and 172 is 60 degrees to provide six equally spaced brazed or welded joints 34. In some embodiments, four branches are used (e.g., in a "K" or "X" shaped pattern with angles A of 45 and/or 90 degrees).

FIG. 13 shows a plan view of endcap 116. In this view, a 60-degree angle A between branch 170 and 172 is formed to equally space six brazed or welded joints 34 about circumference 28 of sidewall 12. Bends 58 on inner endcap segment 140 and outer endcap segment 142 orient the projections 38 of branched endcap segments 140 and 142 on a plane of second end 15 on sidewall 12 at 60-degree intervals around circumference 28.

Figure 14:
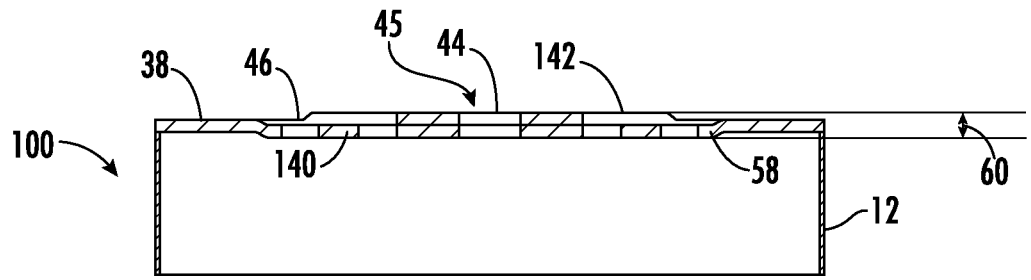
FIG. 14 is a cross-sectional view of the second end of the hole-saw of FIG. 13 taken along line C-C, according to an exemplary embodiment.

FIG. 14 shows a cross-section of hole-saw 100 taken along line C-C of FIG. 13. Similar to FIG. 6, a constructed thread thickness 60 supports hub 44 and is the sum of the thicknesses of inner endcap segment 140 and outer endcap segment 142.

Figure 15:
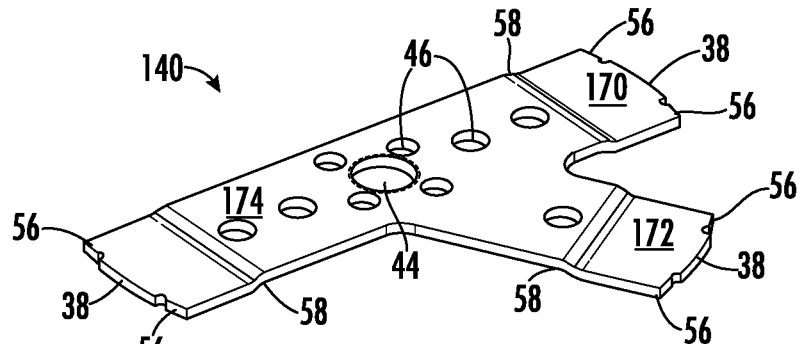
FIG. 15 is a perspective view of an endcap segment used to construct an endcap of a hole-saw, according to an exemplary embodiment.
Figure 16:
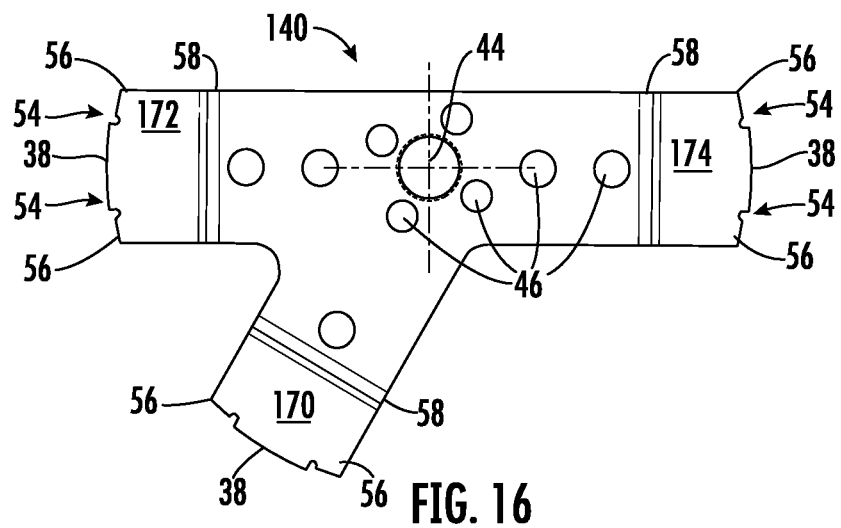
FIG. 16 is a plan view of the segment of FIG. 15, according to an exemplary embodiment.

FIGS. 15-16 show a perspective view and a plan view of an endcap segment 140, respectively. Reference is made to endcap segment 140, but it should be understood that endcap segment 142 is the same as endcap segment 140. Central projections 38 extend from each branch 170, 172, and 174 and are configured to be located within notches 50 of sidewall 12. Lateral projections 56 fit and/or couple within inner surface 24 of sidewall 12.

Figure 17:
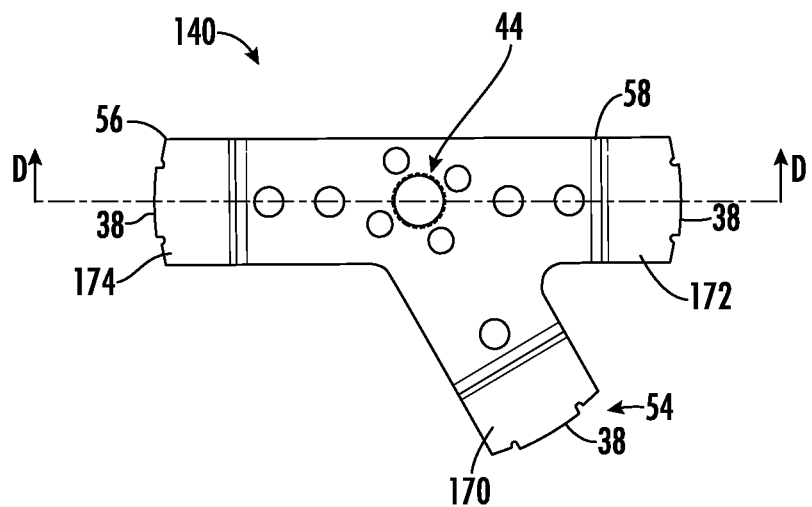
FIG. 17 is a plan view of the segment of FIGS. 15-16, according to an exemplary embodiment.

FIG. 17 shows a detailed plan view of the endcap segment 140. In various embodiments, hole-saw 100 has a diameter 26 between 4 inches and 12 inches, specifically between 3 inches and 10 inches, and more specifically between 4 inches and 8 inches. Similarly, each endcap segment 140 (and/or 142) has a length equal to or greater than the hole-saw 100 diameter 26 and a width between 0.5 inches and 2 inches, specifically between 1 inch and 1.5 inches. Hub 44 has a diameter between 0.25 inches and 2 inches, specifically between 0.5 inches and 1 inch. Openings 46 may also be formed in endcap segment 140 and have a diameter between 0.1 inches to 1 inch, specifically between 0.2 inches and 0.5 inches. In some embodiments, openings 46 have various sizes. For example, endcap segment 140 includes some openings 46 with a diameter between 0.3 inches and 0.5 inches and other openings 46 with a diameter between 0.2 inches and 0.3 inches. In various embodiments, projections 38 have a width between 0.25 inches and 1.5 inches, specifically between 0.5 inches and 1 inch, and more specifically between 0.7 inches and 0.8 inches. Projections 38 include an undercut 54 that enables lateral projections 56 to extend radially along the inner perimeter of sidewall 12.

In a specific embodiment, a 6-inch hole-saw 100 includes two-branched endcap segments 140 and 142 coupled at a hub 44 with a diameter of 5/8 inches. Endcap 116 comprising branched endcap segments 140 and 142, forms six projections 38 that support cylindrical sidewall 12 at six equally spaced brazed or welded joints 34 (e.g., spaced 60 degrees). Each endcap segment 140 and 142 includes five 0.328 inch openings 46 and four 0.269 inch openings 46, for a total of nine openings 46. Branched endcap segments 140 and/or 142 have a width of 1.38 inches±0.2. Undercut 54 enables lateral projections 56 to extend radially from the central projection 38 and couple to inner surface 24. In some embodiments, lateral projections 56 extend away from a centerline of the central projections 38 at an acute angle between 5° and 25°, specifically between 10° and 20°, and more specifically lateral projections 56 extend at a 15°±2.5° angle from the central projections 38. In this configuration, the width of a central projection 38 is between 0.9 inches and 0.6 inches, specifically 0.774±0.10 inches.

Figure 18:
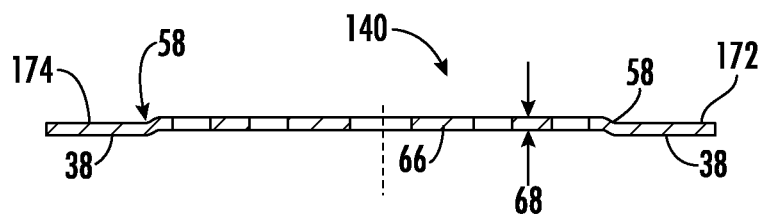
FIG. 18 is a cross-sectional view of the endcap segment of FIG. 17 taken along line D-D, according to an exemplary embodiment.

FIG. 18 is a cross-sectional view of endcap segment 140 taken along line D-D of FIG. 17. The cross-sectional view shows bends 58 between projections 38 and a central flat region 66 of endcap segment 140. Bends 58 displace the central flat region 66 from the plane formed along projections 38. For example, a pair of bends 58 in each branched endcap segment 140 and 142 forms an offset distance 68 between central flat region 66 at the hub 44 and central projections 38 located on each of the branches 170, 172, and 174. When branched endcap segments 140 and 142 are coupled, central projections 38 on each branch 170, 172, and 174 are coplanar about a midplane of endcap 116. Offset distance 68 for each endcap segment 140 and 142 is approximately equal to half the thickness of each endcap segment 140 and 142 to locate each central projection 38 on each branch 170, 172, and 174 on the midplane (e.g., each central projection 38 on endcap 116 is on the same plane or coplanar). Each branch 170, 172, and 174 has two lateral projections 56.

Offset distance 68 is the deflection distance measured between central flat region 66 and a plane tangent to projections 38. In some embodiments, offset distance 68 is one half the thickness or gauge of endcap segment 140. In various embodiments, the thickness of branched endcap segments 140 and 142 is between 0.05 inches and 0.3 inches, specifically between 0.075 inches and 0.2 inches, and more specifically between 0.1 and 0.2 inches. In these various embodiments, offset distance 68 is between 0.025 inches and 0.15 inches, specifically between 0.03 inches and 0.1 inches, and more specifically between 0.05 inches and 0.1 inches. In a specific embodiment, the thickness of endcap segment 140 is 0.105±0.05 inches, and the eccentricity is 0.052±0.02 inches.

In some embodiments, the surface area of central flat region 66 on one side of endcap segment 140 is between 40% and 80% of the total surface area on that side of the endcap segment 140 ("total area"). In various embodiments, the surface area of central flat region 66 is between 50% and 60% of the total area of endcap segment 140, specifically between 55% and 65% of the total area of endcap segment 140. In a specific embodiment, central flat region 66 extends 3.88 inches along the center of a 6-inch diameter 26 endcap 16. In this configuration, the surface area of central flat region 66 on one side of endcap segment 140 is 64.66% of the total surface area on that side of the endcap segment 140.

Figure 19:
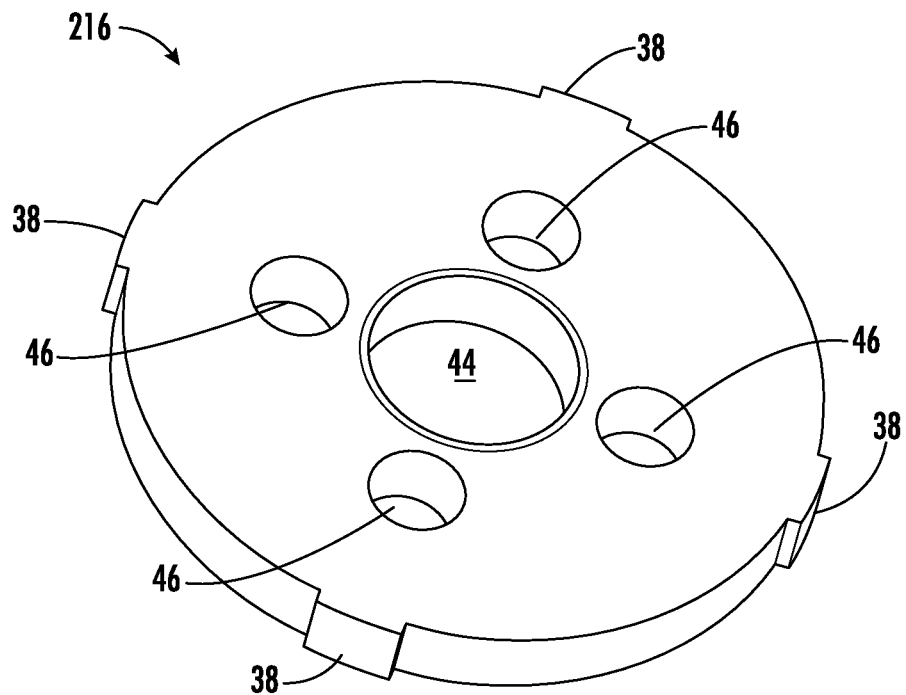
FIG. 19 is a top perspective view of an endcap with central projections, according to an exemplary embodiment.
Figure 20:
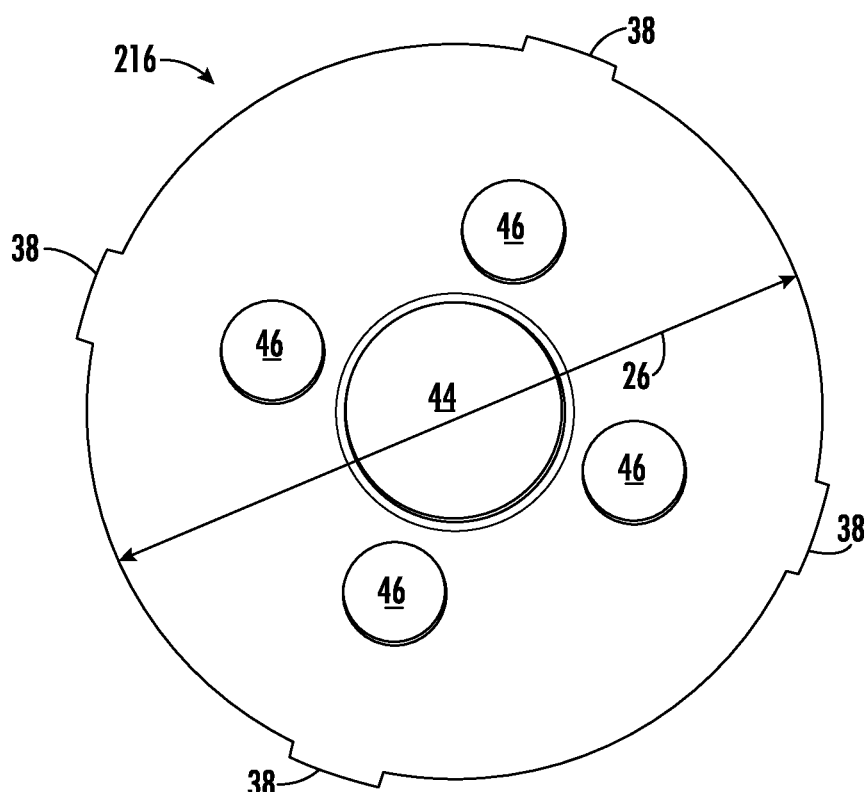
FIG. 20 is a plan view of the cap end of FIG. 19, according to an exemplary embodiment.

FIG. 19 illustrates a top perspective view of endcap 216, according to an exemplary embodiment. Endcap 216 is substantially the same as endcap 16 except for the differences discussed herein. FIG. 20 shows a plan view of endcap 216. With reference to FIGS. 19-20, endcap 216 has a diameter 26 sized to allow endcap 216 to be coupled to a second end 15 of sidewall 12. Unlike endcaps 16 or 116, which are constructed from two or more endcap segments 40 or 140, endcap 216 is a single piece and is formed from a single continuous piece of metal material. Endcap 216 includes projections 38 that couple within sidewall 12 notches 50 (FIG. 4).

Figure 21:
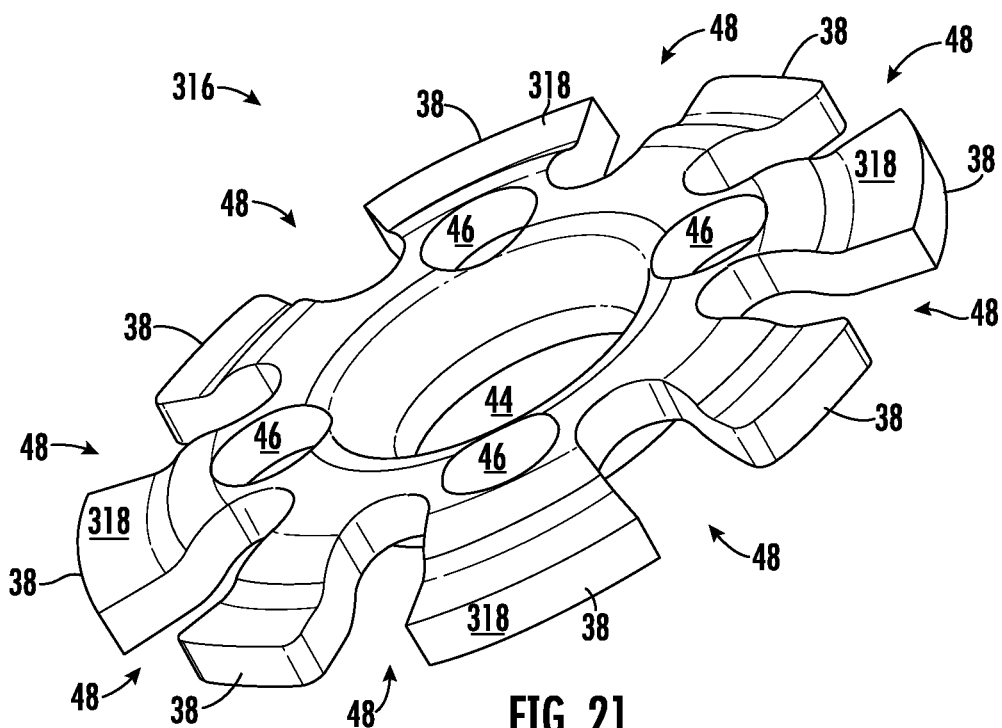
FIG. 21 is a top perspective view of an endcap with central projections and recessed projections, according to an exemplary embodiment.
Figure 22:
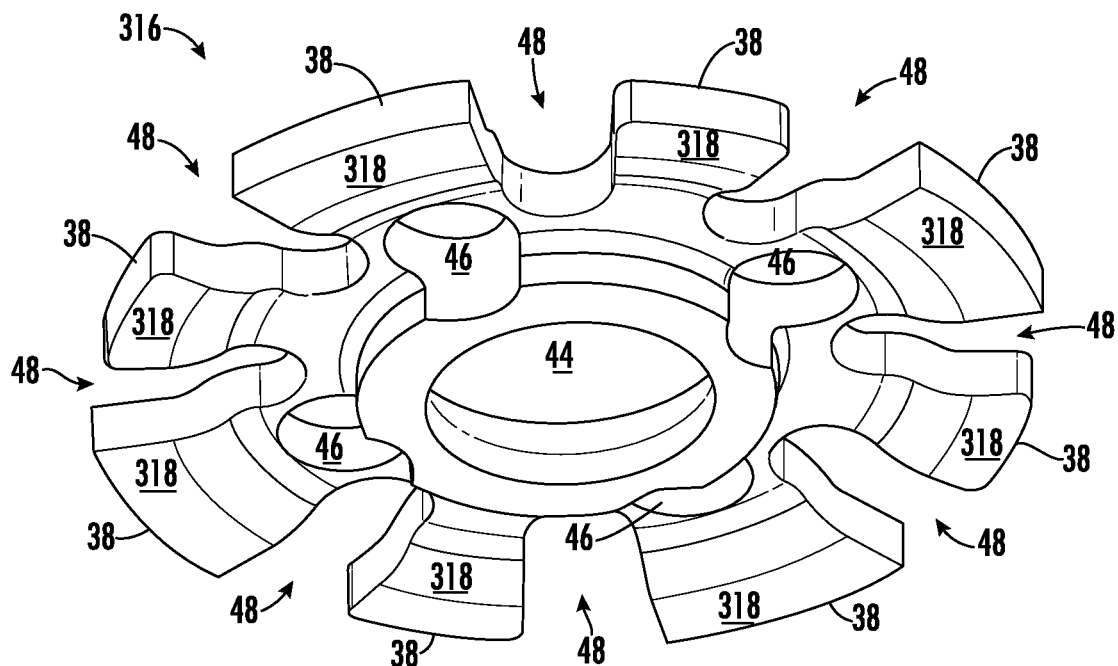
FIG. 22 is a bottom perspective view of the endcap of FIG. 21, according to an exemplary embodiment.
Figure 23:
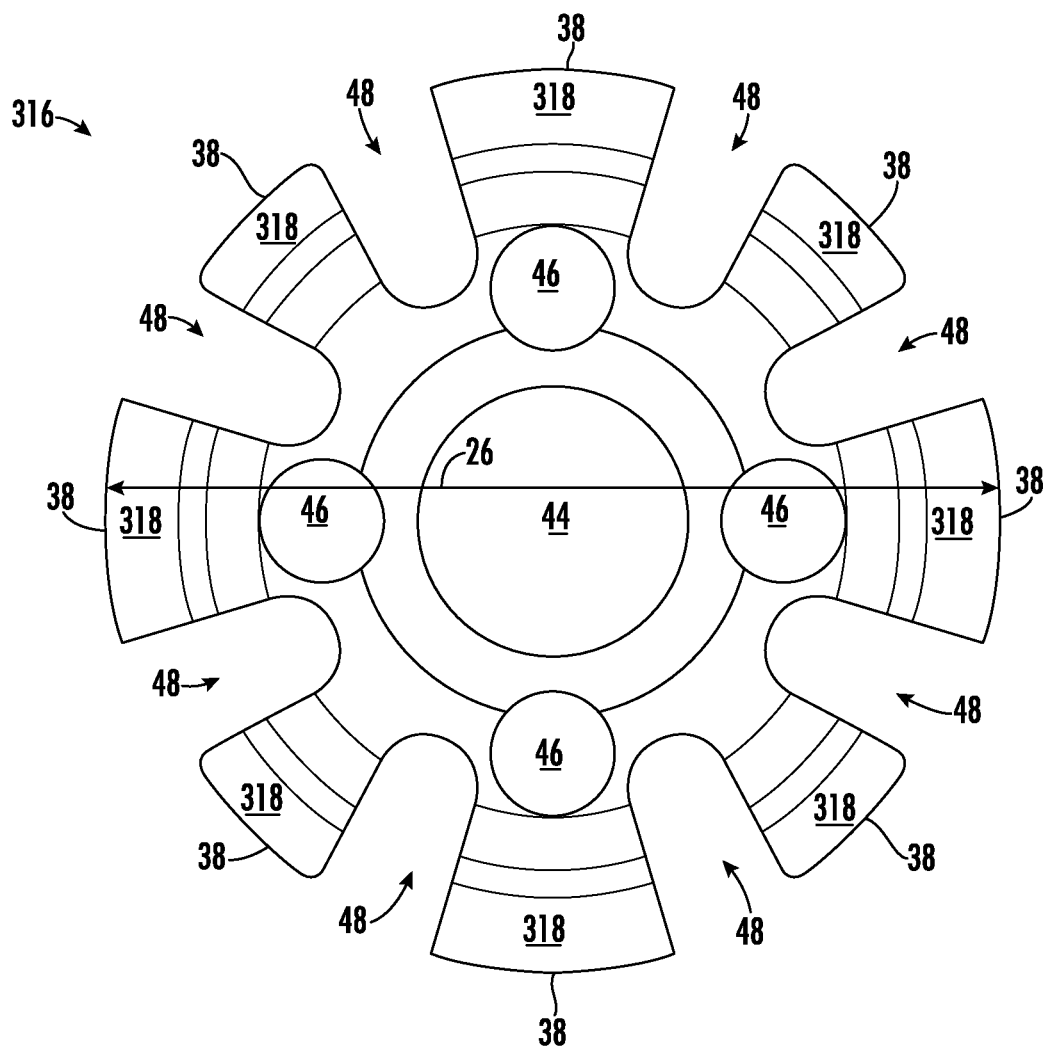
FIG. 23 is a plan view of the endcap of FIG. 21, according to an exemplary embodiment.

FIG. 21 illustrates a top perspective view of a solid endcap 316, according to an exemplary embodiment. FIG. 22 shows a bottom perspective view of endcap 316 and FIG. 23 shows an orthogonal top view of endcap 316. Endcap 316 is substantially the same as or similar to endcap 216 except for the differences described.

With reference to FIGS. 21-23, diameter 26 is sized to couple endcap 316 with sidewall 12 at a brazed or welded joint 34 that couples endcap 316 to the second end 15 of sidewall 12. In contrast to the design of endcap 216, endcap 316 includes spoke-like arms 318, and projections 38 extend radially outward from arms 318. This configuration creates gaps 48. Unlike endcap 16 and 116, which are constructed from two or more endcap segments 40 or 140, endcap 316 is formed from a single continuous piece of metal material.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes, and omissions may also be made in the design, operating conditions, and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred. Also, as used herein, the article "a" is intended to include one or more than one component or element, and is not intended to be construed as meaning only one.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members and any additional member being attached to one another. Such joining may be permanent in nature or alternatively may be removable or releasable in nature. Various embodiments of the invention relate to any combination of any of the features, and any such combination of features may be claimed in this or future applications. Any of the features, elements, or components of any of the exemplary embodiments discussed above may be utilized alone or in combination with any of the features, elements, or components of any of the other embodiments discussed above.

In various exemplary embodiments, the relative dimensions, including angles, lengths, and radii, as shown in the Figures, are to scale. Actual measurements of the Figures will disclose relative dimensions, angles, and proportions of the various exemplary embodiments. Various exemplary embodiments extend to various ranges around the absolute and relative dimensions, angles, and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description. Also, in various embodiments, the present disclosure extends to a variety of ranges (e.g., plus or minus 30%, 20%, or 10%) around any of the absolute or relative dimensions disclosed herein or determinable from the Figures.

What is claimed is:

1. A hole-saw, comprising:
an endcap;
a sidewall forming a hole-saw body when coupled to the endcap, the sidewall comprising:
a cutting edge at a first end of the sidewall; and
a second end coupled to the endcap;
wherein the endcap comprises a first endcap segment having two opposing outer ends and a second endcap segment having two opposing outer ends, wherein the first and second endcap segments are formed as separate, discontinuous, identical segments that are coupled together with different orientations to form the endcap;
wherein the two opposing outer ends of the first endcap segment and the two opposing outer ends of the second endcap segment contact the sidewall and couple the endcap to the sidewall.

2. The hole-saw of claim 1, further comprising a bore defined through a hub of the endcap, the hub and the bore are formed from the first and second endcap segments, wherein the bore is configured to receive an arbor.

3. The hole-saw of claim 1, wherein the first and second endcap segments further comprise a plurality of radially extending central projections;
wherein the sidewall further comprises a plurality of notches located at the second end of the sidewall; and
wherein the central projections are received within the notches of the sidewall and couple the endcap to the sidewall.

4. The hole-saw of claim 3, wherein the first and second endcap segments are arranged such that the central projections of both the first and second endcap segments are coplanar.

5. The hole-saw of claim 3, wherein each central projection of the first and second endcap segments is received within one of the plurality of notches of the sidewall, and wherein the sidewall includes an undercut adjacent each notch that receives the central projection, and further comprising a welded seam that couples the central projections of the first and second endcap segments to one of the notches of the sidewall.

6. The hole-saw of claim 3, further comprising a lateral projection on a side of each of the first and second endcap segments, wherein each lateral projection extends at an angle to the central projection.

7. The hole-saw of claim 3, wherein each of the first and second endcap segments includes two bends to form a central flat region between the central projections.

8. The hole-saw of claim 7, wherein the two bends in first and second endcap segments form an offset distance between a central flat region and the central projections, wherein the offset distance is between 0.05 inches to 0.3 inches.

9. The hole-saw of claim 7, wherein the first endcap segment further comprises:
a first arm with a central projection extending radially outward to a radial outer surface of the first arm;
a second arm with a central projection extending radially outward to a radial outer surface of the second arm; and
a third arm with a central projection extending radially outward to a radial outer surface of the third arm.

10. The hole-saw of claim 9, wherein each arm of the first endcap segment comprises a bend to form a central flat region between the central projections.

11. A hole-saw, comprising:
an endcap, comprising:
a plurality of endcap segments coupled together, each of the plurality of endcap segments comprising two opposing outer ends;
a hub that couples to an arbor, wherein the hub is formed from overlapping central sections of the plurality of endcap segments; and
a sidewall forming a hole-saw body when coupled to the endcap, the sidewall comprising:
a cutting edge at a first end of the sidewall; and
a second end coupled to each of the two opposing outer ends of each of the endcap segments of the endcap.

12. The hole-saw of claim 11, wherein the endcap further comprises a plurality of central projections, wherein an end of each of the plurality of endcap segments comprises one of the plurality of central projections;
wherein the sidewall further comprises a plurality of notches located at the second end of the sidewall; and
wherein the central projections of the endcap are received within the notches of the sidewall and couple the endcap to the sidewall.

13. The hole-saw of claim 12, further comprising brazed joints coupling each of the central projections to one of the plurality of notches.

14. The hole-saw of claim 12, wherein an end of each of the plurality of endcap segments further comprises two lateral projections on opposite sides of the central projection that couple to an inner surface on the second end of the sidewall.

15. The hole-saw of claim 11, further comprising a bore centrally located at the hub, wherein the arbor couples to the bore on the endcap.

16. A hole-saw, comprising:
an endcap comprising:
a first endcap segment comprising opposing outer ends and a first segment bore located between the opposing outer ends of the first endcap segment;
a second endcap segment comprising opposing outer ends and a second segment bore located between the opposing outer ends of the second endcap segment;
a sidewall forming a hole-saw body when coupled to the endcap, the sidewall comprising:
a cutting edge at a first end of the sidewall; and
a second end coupled to the endcap;
wherein the opposing outer ends of the first and second endcap segments are coupled to the sidewall coupling the endcap to the sidewall;
wherein the first and second endcap segments are coupled together such that the first and second endcap segments form a hub and the first segment bore aligns with the second segment bore to form an endcap bore that is configured to couple the endcap to an arbor.

17. The hole-saw of claim 16, wherein the first endcap segment further comprises an opening spaced from the first segment bore; and
wherein the second endcap segment further comprises an opening spaced from the second segment bore.

18. The hole-saw of claim 16, wherein the endcap further comprises a plurality of radially extending central projections;
   wherein the sidewall further comprises a plurality of notches located at the second end of the sidewall; and
   wherein the central projections of the endcap are received within the notches of the sidewall and couple the endcap to the sidewall.

19. The hole-saw of claim 16, wherein the first segment bore is configured to receive a portion of the arbor; and
   wherein the second segment bore is configured to receive a portion of the arbor.

20. The hole-saw of claim 16, wherein the first endcap segment and the second endcap segment are arranged such that gaps are formed between the first endcap segment and the second endcap segment.

* * * * *